United States Patent
Dane et al.

(10) Patent No.: US 7,750,266 B2
(45) Date of Patent: *Jul. 6, 2010

(54) ACTIVE BEAM DELIVERY SYSTEM FOR LASER PEENING AND LASER PEENING METHOD

(75) Inventors: C. Brent Dane, Livermore, CA (US); Fritz B. Harris, Rocklin, CA (US); Joseph T. Taranowski, Livermore, CA (US); Stewart B. Brown, Milpitas, CA (US)

(73) Assignee: Metal Improvement Company LLC, Paramus, NJ (US)

( * ) Notice: Subject to any disclaimer, the term of this patent is extended or adjusted under 35 U.S.C. 154(b) by 832 days.

This patent is subject to a terminal disclaimer.

(21) Appl. No.: 10/990,991

(22) Filed: Nov. 17, 2004

(65) Prior Publication Data

US 2006/0102609 A1    May 18, 2006

(51) Int. Cl.
B23K 26/00 (2006.01)
(52) U.S. Cl. .................. 219/121.6; 219/121.85
(58) Field of Classification Search ............ 219/121.85, 219/121.6
See application file for complete search history.

(56) References Cited

U.S. PATENT DOCUMENTS

| | | | |
|---|---|---|---|
| 3,724,930 A | 4/1973 | Farmer | |
| 4,174,154 A | 11/1979 | Kawasaki | |
| 4,191,928 A | 3/1980 | Emmett | |
| 4,401,477 A | 8/1983 | Clauer et al. | |
| 4,539,462 A | 9/1985 | Plankenhorn | |
| 4,623,229 A | 11/1986 | Galan | |
| 4,698,479 A | 10/1987 | Rando et al. | |
| 4,794,222 A | 12/1988 | Funayama et al. | |
| 4,937,421 A | 6/1990 | Ortiz, Jr. et al. | |
| 5,022,033 A | 6/1991 | Hackell | |
| 5,075,893 A | 12/1991 | Epstein et al. | |
| 5,118,918 A | 6/1992 | Serrano | |
| 5,127,019 A | 6/1992 | Epstein et al. | |
| 5,131,957 A | 7/1992 | Epstein et al. | |

(Continued)

FOREIGN PATENT DOCUMENTS

JP          7246483          9/1995

OTHER PUBLICATIONS

Auerbach, J.M., et al., "Diode-pumped monolithic Nd:YLF 1.053 :m mini-laser and its application to injection seeding," Solid State Lasers SPIE 1223 (1990) 133-141.

(Continued)

*Primary Examiner*—M. Alexandra Elve
(74) *Attorney, Agent, or Firm*—Haynes Beffel & Wolfeld LLP

(57) ABSTRACT

A laser peening method and system allows the work piece to be fixed, while moving and directing the laser beam. A laser energy delivery system includes a relay imaging system. Input optics arranged to receive the laser energy, a transmitting mirror having adjustable angle of incidence relative to the input optics, and a robot mounted processing head including an optical assembly are configured to direct laser energy toward the movable target image plane. The laser energy follows an optical path including an essentially straight segment from the transmitting mirror to the receiving mirror, having a variable length and a variable angle relative to the input optics. Diagnostics on the processing head facilitate operation.

41 Claims, 6 Drawing Sheets

U.S. PATENT DOCUMENTS

| | | | |
|---|---|---|---|
| 5,132,887 A | | 7/1992 | Torii et al. |
| 5,142,118 A | | 8/1992 | Schlatter |
| 5,239,408 A | | 8/1993 | Hackel et al. |
| 5,332,881 A | | 7/1994 | Topkaya et al. |
| 5,449,879 A | | 9/1995 | Lawson et al. |
| 5,525,429 A | | 6/1996 | Mannava et al. |
| 5,569,018 A | | 10/1996 | Mannava et al. |
| 5,571,575 A | | 11/1996 | Takayanagi |
| 5,670,069 A | | 9/1997 | Nakai et al. |
| 5,674,328 A | | 10/1997 | Mannava et al. |
| 5,674,329 A | | 10/1997 | Mannava et al. |
| 5,689,363 A | | 11/1997 | Dane et al. |
| 5,741,559 A | | 4/1998 | Dulaney |
| 5,986,234 A | * | 11/1999 | Matthews et al. ...... 219/121.68 |
| 5,986,236 A | | 11/1999 | Gainand et al. |
| 6,072,149 A | * | 6/2000 | Maruyama et al. ..... 219/121.63 |
| 6,127,649 A | | 10/2000 | Toller et al. |
| 6,198,069 B1 | | 3/2001 | Hackel et al. |
| 6,215,097 B1 | | 4/2001 | Mannava |
| 6,259,055 B1 | | 7/2001 | Sokol et al. |
| 6,288,358 B1 | * | 9/2001 | Dulaney et al. .......... 219/121.6 |
| 6,384,371 B1 | | 5/2002 | Hinei et al. |
| 6,410,884 B1 | * | 6/2002 | Hackel et al. .......... 219/121.85 |
| 6,462,301 B1 | | 10/2002 | Scott et al. |
| 6,528,763 B1 | * | 3/2003 | Lahram et al. ......... 219/121.85 |
| 6,657,160 B2 | | 12/2003 | Hackel et al. .......... 219/121.85 |
| 6,747,241 B2 | | 6/2004 | Shikoda et al. |
| 6,867,390 B2 | * | 3/2005 | Clauer et al. ........... 219/121.85 |
| 7,109,436 B2 | * | 9/2006 | Even et al. ............. 219/121.68 |
| 2002/0096503 A1 | | 7/2002 | Hackel et al. |
| 2003/0217997 A1 | | 11/2003 | Clauer et al. |
| 2005/0006361 A1 | * | 1/2005 | Kobayashi et al. ..... 219/121.73 |
| 2005/0045598 A1 | * | 3/2005 | Even et al. ............... 219/121.6 |
| 2006/0102602 A1 | | 5/2006 | Dane et al. |
| 2006/0102604 A1 | | 5/2006 | Dane et al. |

OTHER PUBLICATIONS

Crofts, G.J., et al., "Experimental and theoretical investigation of two-cell stimulated-Brillouin-scattering systems," J. Opt. Soc. Am. B, vol. 8, No. 11, Nov. 1991, 2282-2288.

Dane, C. B., et al., "Design and Operation of a 150 W Near Diffraction-Limited Laser Amplifier with SBS Wavefront Correction," IEEE Journal of Quantum Electronics 31(1) (Jan. 1995), 148-163.

Fairand, B.P., et al., "Laser shock-induced microstructural and mechanical property changes in 7075 aluminum," J. Appl. Phys., vol. 43, No. 9, Sep. 1972, 3893-3895.

Hanna, D.C., et al., "Single longitudinal mode selection of high power actively Q-switched lasers," Opto-Electronics 4 (1972), 249-256.

Park, Y.K., et al., "Single Axial Mode Operation of a Q-Switched Nd:YAG Oscillator by Injection Seeding," IEEE Journal of Quantum Electronics 20(2) (Feb. 1984), 117-125.

Park, Y.K., et al., "Electronic Linewidth Narrowing Method for Single Axial Mode Operation of Q-Switched Nd:YAG Lasers," Optics Communications 37(6) (Jun. 15, 1981), 411-416.

3M Fluorinert Liquids for Electronics Manufacturing, Product Information, Apr. 1999, 4 pages.

* cited by examiner

ACTIVE BEAM DELIVERY SYSTEM FOR LASER PEENING AND LASER PEENING METHOD

BACKGROUND OF THE INVENTION

1. Field of the Invention

The present invention relates to high energy laser systems, to beam delivery systems, and to laser peening systems suitable for use with stationary targets.

2. Description of Related Art

The use of mechanical shocks to form metals and to improve their surface properties has been realized for ages. In current industrial practice, a peening treatment of metal surfaces is accomplished by using high velocity shot. Treatment improves surface properties and, very importantly for many applications, results in a part displaying significantly improved resistance to fatigue and corrosion failure. A wide range of work pieces are shot peened in the aerospace and automotive industries. However, for many applications, shot peening does not provide sufficiently intense or deep treatment, or cannot be used because of its detrimental effect on the surface finish.

With the invention of the laser, it was rapidly recognized that the intense shocks required for peening could be achieved by means of a laser-driven, tamped plasma. B. P. Fairand, et al., "Laser Shot Induced Microstructural and Mechanical Property Changes in 7075 Aluminum," Journal of Applied Physics, Vol. 43, No. 9, p. 3893, September 1972. Typically, a plasma shock of 10 kB to 30 kB is generated at metal surfaces by means of high energy density (about 200 j/cm$^2$), short pulse length (about 30 nanoseconds) lasers. A thin layer of metal tape, black paint or other absorbing material on the metal surface provides an absorber to prevent ablation of the metal. A confining or tamping material such as water covers the surface layer providing an increased intensity shock. These shocks have been shown to impart compressive stresses, deeper and more intense, than standard shot peening. In testing, this treatment has been shown to be superior for strengthening work pieces from fatigue and corrosion failure. Laser peening is also used for forming and texturing surfaces.

One laser system which has been utilized for this purpose is described in our prior U.S. Pat. No. 5,239,408, entitled HIGH POWER, HIGH BEAM QUALITY REGENERATIVE AMPLIFIER. The laser system described in the just cited '408 patent comprises a high power amplifier in a master oscillator/power amplifier MOPA configuration capable of producing output pulses greater than 20 Joules per pulse with the pulse width on the order of 10 to 30 nanoseconds or less using a wavefront correcting configuration based on a stimulated Brillouin scattering SBS phase conjugator/mirror system.

In current commercial high energy laser peening processes, the laser beam position is held at a fixed location. The work piece being treated is moved through the laser beam to create the applied spot pattern while maintaining the desired incidence angles, spot sizes, and orientations. This requires automation and work piece holding fixtures to grip the work piece and move it through its programmed positions. This method becomes both costly and highly work piece specific, requiring considerable engineering to develop processes for new work pieces. In addition, work piece size is limited to the lifting and handling capacity of the automation utilized. Work pieces and structures larger than automation handling capacity (for example, >1 m and/or >100 kg) cannot be laser peened by the conventional work piece moving approach.

Flexible beam delivery systems are often based on the use of optical fibers. However, even at wavelengths where glass fiber transmission is normally high, the very high pulse energy and high peak power used in laser peening can damage the fibers and render them ineffective. For example, a 25 J pulse is 100 times the maximum pulse energy (250 mJ) that can be delivered through a 1 mm multi-mode fiber. For single frequency beams, such as used in representative laser peening applications, glass fibers have even lower damage thresholds.

Approaches to actively scanning a laser beam for the delivery of high power carbon dioxide ($CO_2$) cutting and welding lasers have been developed. Because of its 10 μm wavelength in the far infrared, the output of a $CO_2$ laser cannot be delivered by glass fibers. Commercial articulated arms have been developed for high power $CO_2$ lasers that consist of a series of hollow tubes connected by seven articulation points (commonly called knuckles), each of which houses a 45 degree mirror. There are a number of important drawbacks to an articulated arm for laser peening that lead us to develop an alternative approach:

1. Beam rotation—For laser peening, it is desirable to use a square beam (unlike $CO_2$ lasers) and the out-of-plane reflection at each articulated joint would cause some degree of beam rotation. Although this could be compensated by appropriately rotating the square beam before it enters the arm, the precise orientation of each arm segment would need to be known. Since there are multiple arm positions for a given delivery angle to the part, each of the seven rotational joints would need to be accurately encoded.

2. Pointing accuracy—The arms in the apertures needed to transmit a peening beam typically have a pointing accuracy of only 1 mrad, corresponding to up to 1 mm error in the positioning of a 3 mm spot, as used for example in laser peening.

3. Optical losses—A standard seven-knuckle articulated arm would require seven mirror reflections between the input and the output, introducing optical losses during beam delivery that reduce efficiency of the system.

4. Length limitations—Articulated arms have a fixed length, allowing limited flexibility as to placement with respect to the work piece. The maximum delivery length would also be limited by the weight and mechanical stiffness of tubular arm segments and the bearing loads at each joint.

5. Process development—Typically, the articulated arm is designed to be quite flexible; its design under-constrained so that multiple knuckle configurations are possible for a given treatment spot. However, it is still possible to damage the arm by forcing it through disallowed paths or by causing collisions with the process robot. For this reason, much of the complex robot path development already associated with the moving part process would still be needed.

It is desirable to provide a system that provides sufficient flexibility to be able to treat large work pieces and work pieces "in situ" at customer facilities, like aircraft parts at an aviation repair station or large oil drilling work pieces at a pipe yard.

SUMMARY OF THE INVENTION

A laser peening method and system, which allow the work piece to be fixed, while moving and directing the laser beam in a highly controlled manner are described. Utilizing a fixed work piece position minimizes holding fixture and work piece moving complexity, thereby reducing cost and engineering. Moving the laser beam rather than the work piece, or with limited movement of the work piece, will allow work pieces larger than automation handling capacity to be cost effectively laser peened.

A method and system for delivering laser energy, including laser energy having high power such as used in laser peening, is provided. An embodiment of a laser energy delivery system for high power laser energy includes a relay imaging system which relays an image of an output of the source of laser energy to the target image plane near the surface of the work piece. The relay imaging system includes input optics arranged to receive the laser energy from the output of the source of laser energy, a transmitting mirror having adjustable angle of incidence relative to the input optics, and a robot mounted optical assembly directing laser energy toward the target image plane. The robot mounted optical assembly includes a receiving mirror having adjustable angle of incidence relative to the transmitting mirror and output optics which condition the laser energy for the target surface. The laser energy follows an optical path including an essentially straight segment from the transmitting mirror to the receiving mirror. This segment has a variable length and variable angle relative to the input optics. As a robot mounted optical assembly is positioned to point the laser beam onto target locations on the target surface, the transmitting mirror and receiving mirror angles are adjusted, varying the length and angle of the segment of the optical path between them, to couple the laser energy from the input optics to the output optics through air. The input and output optics perform the image relay, positioning a near field image of the output of the source of laser energy at the target image plane. The robot mounted optical assembly is manipulated to position the laser beam so that the target image plane lies within a range of the target surface of the work piece, so that the beam shape at the target surface is close to the beam shape near the output of the source of laser energy.

A robotic system for delivering laser energy from a source of laser energy to a target surface on the work piece is provided suitable for use in laser peening, and for other uses. An embodiment of such system includes beam delivery optics having adjustable components arranged to receive the laser energy from an output of the source of laser energy and to direct the laser energy along an optical path toward the target surface. The optical path includes a variable segment between components of the beam delivery optics having a variable length and variable direction through air. The beam delivery optics establish an output beam line for the laser energy. The controller is coupled to the adjustable components of the beam delivery optics to move the output beam line for the laser energy, continuously or in a stepwise fashion, among target positions on the target surface. Diagnostic sensors are provided with the beam delivery optics in embodiments of the technology, and the information provided by such sensors can be fed back to the controller for precise robotic control of the system and other diagnostic functions.

In embodiments of the invention, the beam delivery optics include input optics arranged to receive the laser energy from an output of the source of laser energy, and to direct laser energy on a first optical path segment. A transmitting mirror having an adjustable angle of incidence relative to the first optical path segment reflects the laser energy on the second optical path segment, which comprises the variable segment mentioned above, of the optical path. A robot mounted optical assembly includes a receiving mirror adapted to be positioned in the second optical path segment. The receiving mirror has an adjustable angle of incidence relative to the second optical path segment to reflect the laser energy on a third optical path segment. An output telescope is included in the robot mounted optical assembly and positioned in the third optical path segment. The output telescope directs the laser energy toward the target surface on the output beam line. The input optics in embodiments of the system include a telescope arranged to project the laser energy along the first optical path, and to enlarge the cross-section of the laser energy for propagation across the variable length segment through air.

Also, in embodiments of the system, optics are provided for rotating cross-sections of the laser energy to offset rotation caused by the beam delivery optics and maintain consistent orientation of the laser energy on the target surface. Thus, in an embodiment of the system, the cross-section of the laser energy is rectangular, and reflections off of the transmitting and receiving mirrors at variable angles tend to cause rotation of the rectangle. In one embodiment, first and second pulses of laser energy are directed on first and second beam paths for delivery to the target surface, and the first and second beam paths have respective incident and reflected beam lines at the transmitting mirror and respective incident and reflected beam lines at the receiving mirror. Optics are provided for rotating the cross-section of the first and second pulses according to an angle between the plane containing the incident and reflected beam lines on the transmitting mirror and a plane containing incident and reflected beam lines on the receiving mirror.

Other aspects and advantages of the present invention can be seen on review of the drawings, the detailed description and the claims, which follow.

DETAILED DESCRIPTION

A detailed description of embodiments of the present invention is provided with reference to the FIGS. 1-7. The articulated segments and seven mirrors of a conventional energy delivery system are replaced in embodiments of the energy delivery system described herein, with two mirrors on high-speed, high-resolution gimbals. Propagation to a laser peening processing head that comprises a robot mounted optical assembly is by a free air path between the two gimbal-mounted mirrors. Beam diagnostics also located on the processing head monitor laser pointing, beam rotation, and laser energy on a shot-to-shot basis. Finally, a processing camera, located on the output of the tool, images the laser peening treatment plane.

Figure 1:
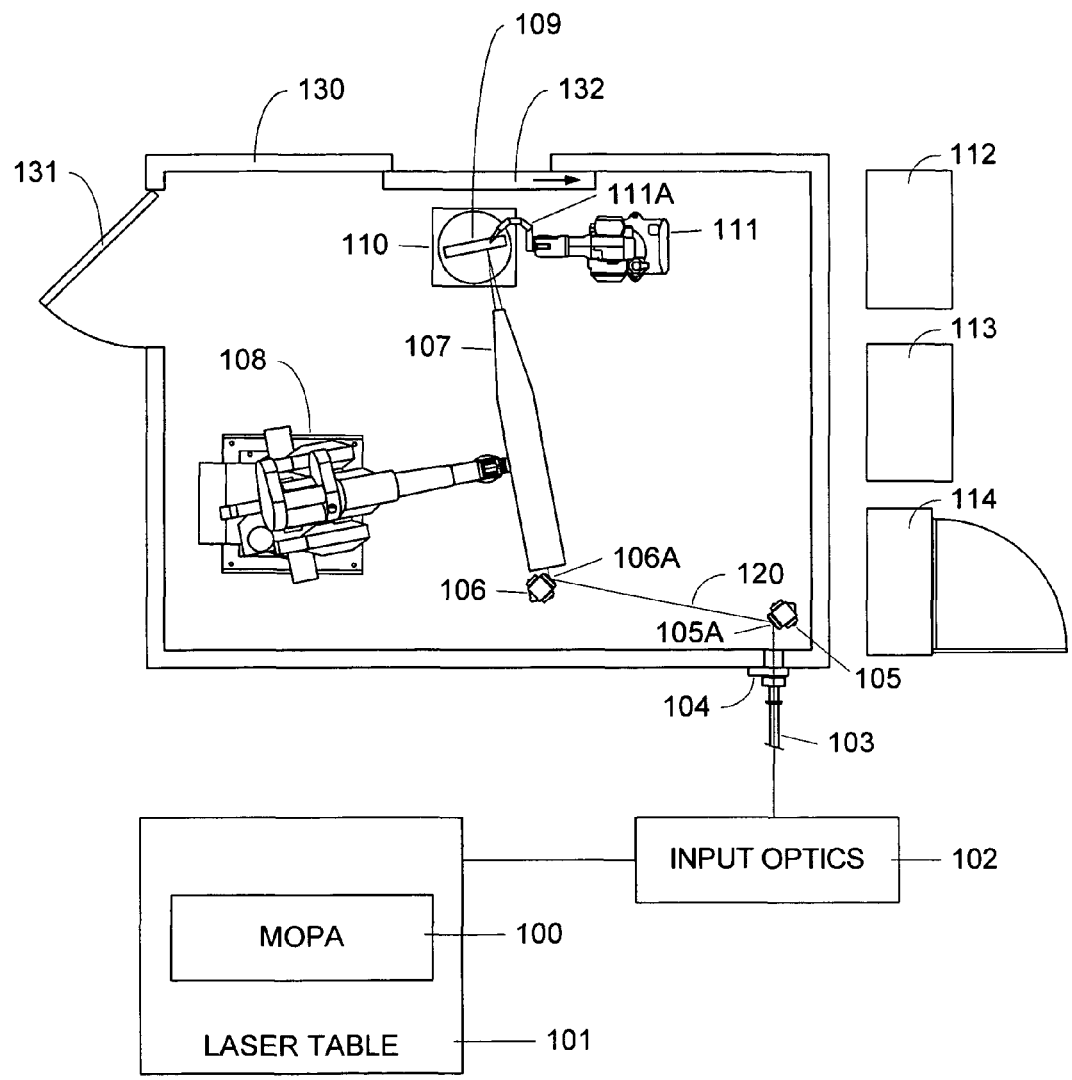
FIG. 1 is a diagram of an energy delivery system configured for laser peening a work piece.
Figure 7:
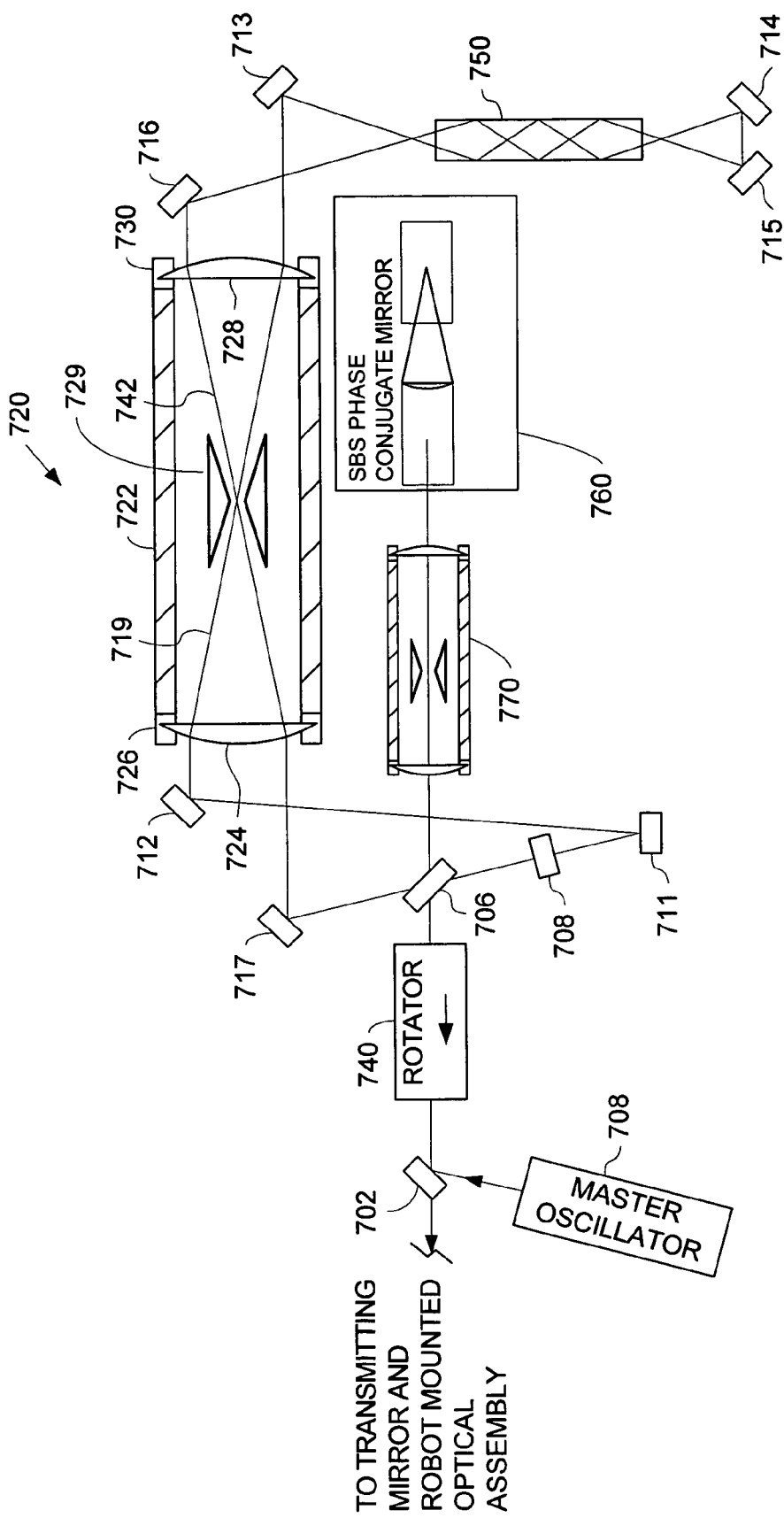
FIG. 7 is a diagram of a source of laser energy configured for use in combination with energy delivery systems like those of FIGS. 1 and 2.

FIG. 1 shows a schematic of a laser peening system. This is not meant to be a scale design of an actual system but illustrates basic components and their layout. The system of FIG. 1 includes a laser 100 in a master oscillator/power amplifier configuration, such as illustrated in FIG. 7, or other laser energy source. The laser 100 is mounted on a stable laser table 101. Output from the source of laser energy is applied to input optics 102 which condition the beam for delivery through a relay telescope 103 to a transmitting mirror 105A mounted on transmitting mirror gimbal 105. The transmitting mirror 105A reflects the beam to a receiving mirror 106A mounted on receiving mirror gimbal 106. The receiving mirror 106A on receiving mirror gimbal 106 is part of a robot mounted optical assembly 107, which is in turn positioned by robot 108. The robot mounted optical assembly 107 includes output optics for directing the beam to a target location on a surface of a work piece 109. In this embodiment, the work piece 109 is mounted on a rotatable parts holder 110. A water delivery robot 111 is mounted near the parts holder 110, and includes a vessel 111A for delivery of tamping fluid in the laser peening application. The robot 111 in embodiments of the technology also controls placement of a coordinate measuring metrology touch probe (such as the Renishaw style) used during laser peening operations. A controller 112 for the robot 111, a controller 113 for the robot 108, and a controller 114 for coordinating operation of the robots and adjustable components in the beam delivery system and in the laser 100, and other controllable components are provided with the system.

The basic optical path from the input optics 102 to the target work piece includes just two turns in this embodiment, which are controlled using high-speed, high-resolution gimbals. The optical path includes a segment 120, between the transmitting mirror 105A and the receiving mirror 106A, which is essentially straight and has a variable length through air, and a variable direction defined by the angle setting of the transmitting mirror gimbal. The variable length is controlled by the robot 108 based on the positioning of the optical assembly 107 when moving the beam line to a target location on the surface of the work piece 109. Likewise, the variable direction is set using the gimbals 105, 106 according to the positioning of the optical assembly 107. In the embodiment illustrated, the segment 120 extends through free air, that is without an enclosure such as a tube. In other embodiments, a telescoping tube or other enclosure could be provided so long as it is sufficiently adjustable.

The water robot 111 is used to deliver the transparent tamping layer to the surface of the treated part. An alternative system integrates a water delivery vessel on to the robot 108 along with the robot mounted optical assembly 107.

A process chamber 130 is illustrated, including an access door 131 for technicians, a parts access door 132 which allows access to the parts holder 110, and a shutter 104 for admitting the laser radiation. The process chamber 130 allows provision of a controlled environment for the operation of the robot 108, with a parts holder 110 used to provide only limited positioning functions for the laser peening operation. The process chamber 130 is mounted on a platform, such as a foundation or movable plank, and the transmitting mirror gimbal 105, robot 108 with the robot mounted optical assembly 107, the robot 111 and the rotatable parts holder 110 are all mounted thereon in a fixed spatial relationship. The laser 100 and input optics 102 are mounted on separate stages, closely coupled with the process chamber 130.

Figure 2:
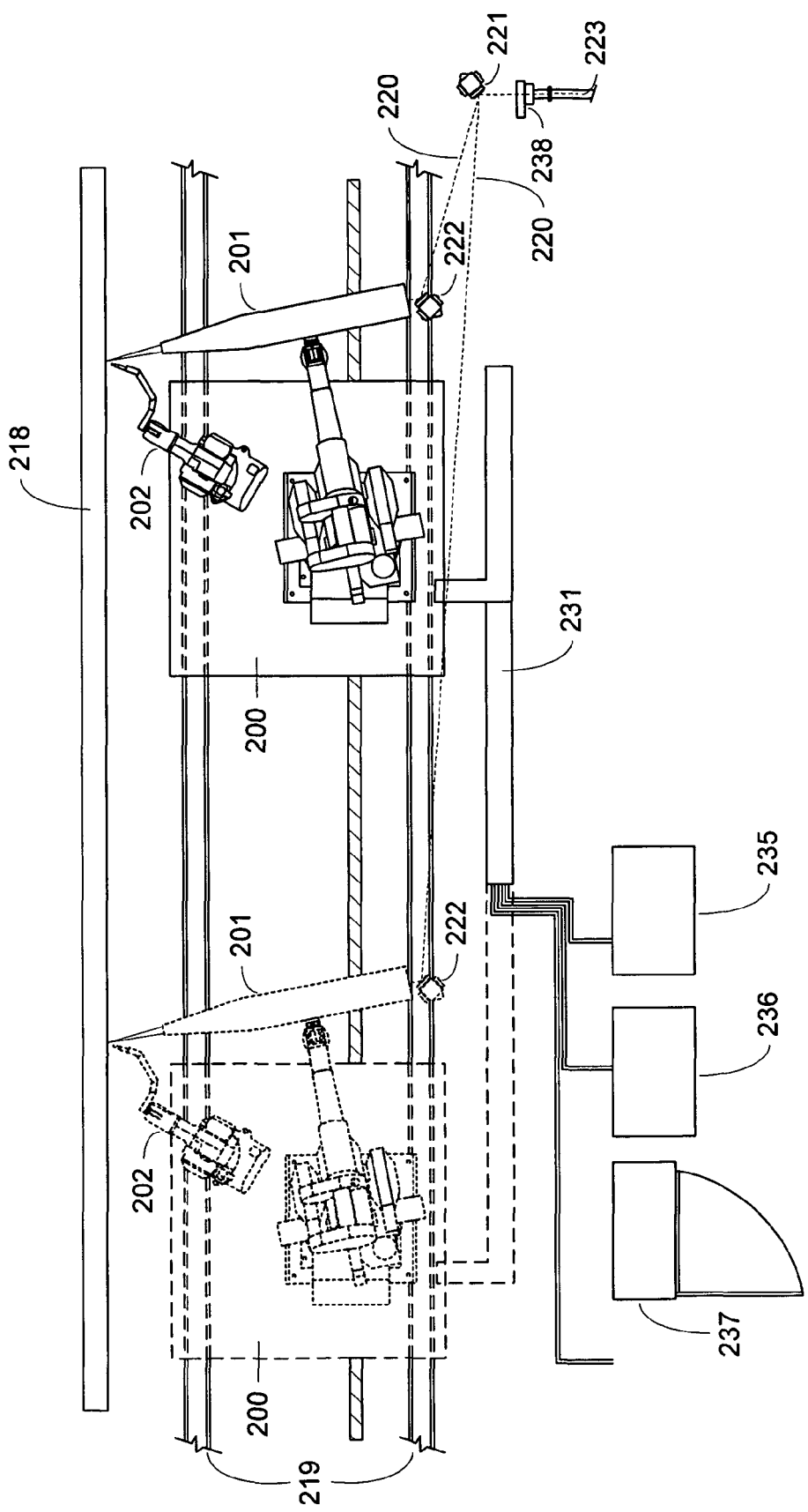
FIG. 2 is a diagram of an energy delivery system configured in laser peening a work piece in situ.

FIG. 2 illustrates a configuration for the treatment of a very large part, such as in laser peen forming work pieces in situ mounted on large structures. In the illustrated embodiment, the robot mounted optical assembly 201 and the water robot 202 are mounted onto a common process platform 200 that can be moved along a set of precision tracks 219 to access different portions of an extended part 218, such as a wing skin on an airplane. The free air propagation of the treatment beam along the segment 220 from the transmitting mirror gimbal 221 to the receiving mirror gimbal 222, allow a flexible distance between the laser source supplying the input 223 at the transmitting mirror and the robot mounted optical assembly 201. The driving mechanism, such as a screw drive 230, is coupled to the platform 200, and allows for precision movement of the platform 200 adjacent a large object. Utilities including air, water and electrical conduits and the like are provided in a utilities trackway 231 along the tracks 219. The controller comprising the water robot controller 235, the controller 236 for the robot used for positioning of the optical assembly 201, and other control logic 237 are coupled to the utilities and to the devices on the track. Input optics are coupled to a shutter 238 between the output of the laser and the transmitting mirror gimbal 221.

In this case, the robot mounted optical assembly and the water robot are mounted onto a common platform that can be moved along a set of precision tracks to access different portions of an extended part, such as a wing skin. The active beam delivery system uses free air propagation of the treatment beam, allowing a flexible distance between the laser source and the treatment tool. The incorporation of both robots onto a single platform enables the delivery of laser energy at locations difficult to reach otherwise. Examples of this could be an elevated platform at the level of an airplane wing or vertical fin attachment bulkhead. The laser source can remain securely installed at ground level, feeding laser light to the remote treatment location. For extended propagation distances between the laser and the robot mounted optical assembly, e.g. greater than 5 m, the relay optics can be modified on the laser system.

Figure 3:
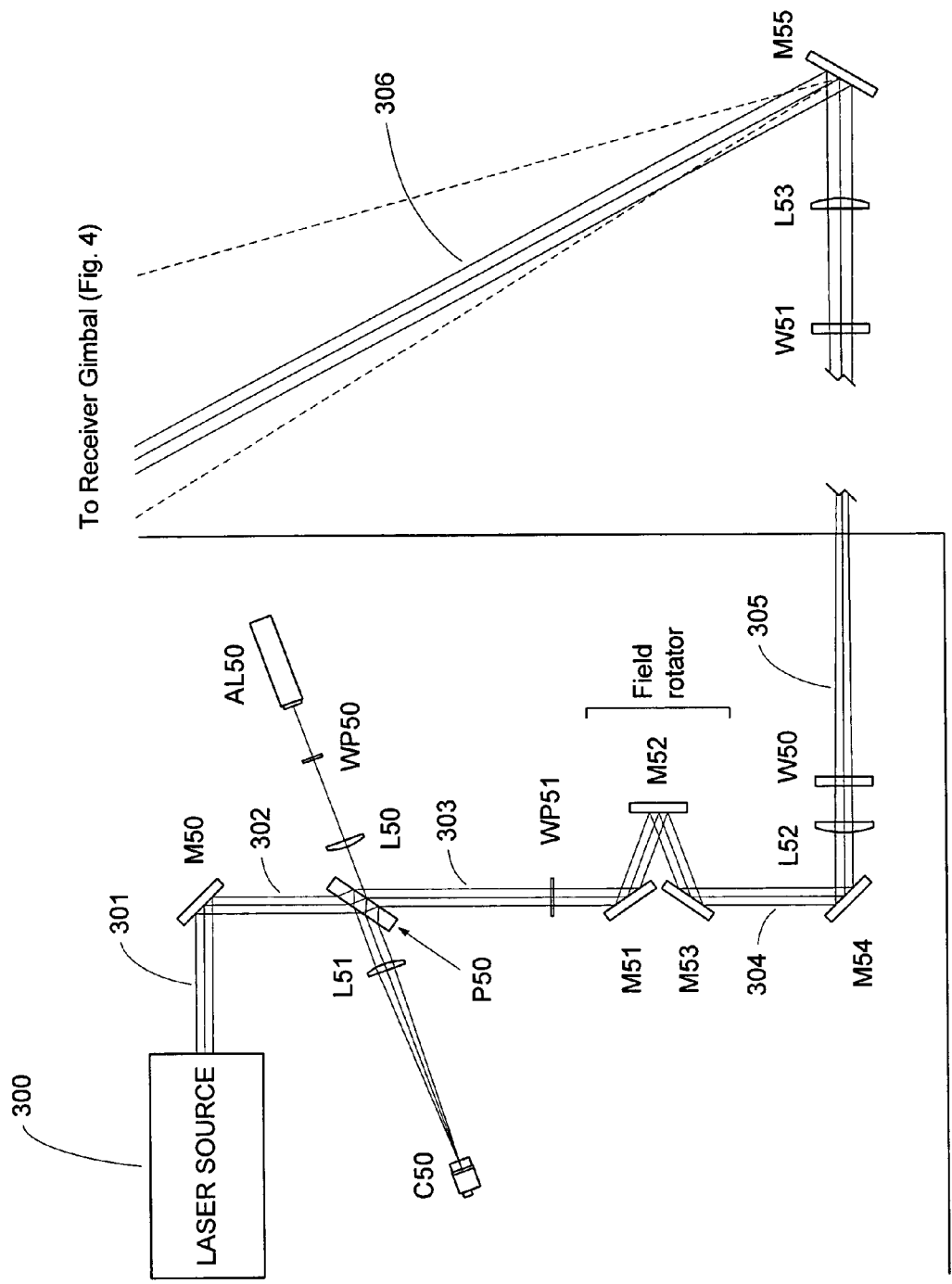
FIG. 3 is a diagram of input optics and a transmitting mirror for energy delivery systems like those of FIGS. 1 and 2.

FIG. 3 illustrates a layout for input optics up to the transmitting mirror, labeled M55 in FIG. 3. Laser source 300 provides an output beam on line 301 defining a first segment of the optical path. Mirror M50 reflects the beam on line 302 defining a second segment of the optical path to active alignment optics which comprise alignment laser AL50, half wave plate WP50, lens L50, polarizer P50, lens L51 and camera C50. The beam which propagates through the polarizer P50 proceeds on a third segment of the optical path along line 303 through wave plate WP51 to field rotator optics which comprise mirror M51, mirror M52 and mirror M53. From mirror M53, the beam as rotated propagates on a fourth segment of the optical path on line 304 to mirror M54. Mirror M54 turns the beam through a beam transport telescope (also called relay telescope) which comprises lens L52 and lens L53, on a fifth segment of the optical path along line 305 to the gimbal-mounted transmitting mirror M55. Windows W50 and W51 define the input and output of a vacuum chamber (not shown) for the telescope, in which the beam is brought through a focus. The transmitting mirror M55 turns the beam on a variable angle along a sixth segment of the optical path on line 306, which is directed at the receiving mirror on the robot mounted optical assembly as described above, through a variable length of air.

The alignment laser AL50 in one embodiment comprises a continuous-wave (CW, i.e. non-pulsed) laser to verify correct alignment and, if necessary, to enable feedback adjustments to the alignment in between laser shots. In one embodiment, the alignment laser AL50 comprises a diode-pumped Nd:YLF laser which produces relatively low output power (<500 mW). The alignment laser AL50 has the same wavelength as the peening laser 300, or is otherwise configured so that the reflecting and focusing properties of the alignment beam through all of the optics can be reliably used for alignment of the high power beam.

The divergent output from alignment laser AL50 (<500 mW) is collimated by lens L50 and combined with the high power beam path at polarizing beam splitter P50. Using half waveplate WP50, the polarization of the alignment laser is set to S-polarization so that it reflects at the polarizer on the beam line 303. A small portion of the high power beam transmitted in P-polarization is reflected at the polarizer P50, and a small portion of the alignment beam is transmitted through polarizer P50 to the camera C50. Diagnostic camera C50 detects the positions of the alignment and high power beams, and provides feedback for achieving precise co-alignment. The camera is placed at the focus of lens L51. When the far field (focal point) of the small leakage of the high power beam reflected from the surface of polarizer P50 precisely overlaps the focal point of a portion of the alignment beam that transmits through the polarizer P50, then co-alignment is confirmed. Waveplate WP50 can be rotated to allow the fraction of alignment beam transmission through the polarizer P50 to be adjusted.

In embodiments of the system in which the output of the high power laser is not round, rotation of the cross-section of the beam caused by the transmitting and receiving mirrors is compensated in the field rotator optics. For example, in a laser peening system, a square beam cross-section, or other rectangular shape, is preferred. Depending on the relative angle between the plane containing the incident and reflected beams on the gimbal-mounted transmitting mirror M55 and the plane containing the incident and reflected beams on the gimbal-mounted receiving mirror M56 (see FIG. 4), the square beam will be rotated with respect to the coordinates of the robot mounted optical assembly. The field rotator optics pre-rotate the beam cross-section so that the desired spot orientation is delivered to the target surface. The field rotator optics consist of three mirrors M51-53 which are rigidly mounted on a common structure which can rotate around the input beam axis using a remotely controlled rotational stage. Since there is an odd number of reflections (3), rotating this three mirror assembly will cause the square beam to rotate at 2× the rate, i.e. a 45 degree mirror assembly rotation will cause a full 90 degree beam rotation. In the case of a square beam, a ±22.5 degree rotation of the field rotator will provide all required beam orientations. Other optical arrangements can be utilized for providing field rotation.

It may be desirable, e.g. for off-axis peening, that the polarization state of the beam not be orthogonally aligned to the square beam shape. Waveplate WP51, placed in the high power beam path, will allow the polarization to be rotated to an arbitrary linear state. Like the field rotator, it will be mounted in a remotely-controlled rotational stage and the polarization will rotate at 2× the rate of rotation of the stage.

The transport telescope, formed from lenses L52 and L53, serves to enlarge the square beam and to relay an optical image across the free-propagation path to the processing head comprising the robot mounted optical assembly. Through this telescope, the beam is magnified in one embodiment by about 1.4× from a nominal dimension of 23 mm square to 32.5 mm. This has three functions. The first is that the beam area is increased by 2× on the transmitter and receiver mirrors, lessening the risk of optical damage. The second function is that the relay distance of the telescope is increased by the magnification squared (i.e. 2×) making it possible to provide a well defined beam image at the distant treatment plane. Finally, magnifying the beam increases the Raleigh range (defined as twice the confocal parameter) by 2× with a 1.4 times magnification, improving the free-space propagation characteristics of the beam. This third function is important since the optical relay telescope and the beam delivery telescope in the processing head have been optimized for a single propagation distance. However, as the processing head is maneuvered within a ±45 degree processing solid angle, the actual propagation distance between the gimbals can vary by up to ±1 m. This variation can be even larger in the case of the arrangement for in situ laser peening of large parts as shown in FIG. 2.

The transmitter and receiver gimbals are of similar design and specifications in an embodiment of the system. The motor for a representative system in each axis has a resolution of 25 μrad (5.2 arcsec), a repeatability of 50 μrad (10.3 arcsec), and an absolute accuracy of 100 μrad (20.6 arcsec). These specifications are for the actual reflected beam; the values for the mirror angles are 2× smaller. The transmitter and receiver mirrors are 4" in diameter in a representative embodiment, and have a high damage threshold coating that efficiently reflects the beam over an angle of incidence range of 15-55 degrees.

Figure 4:
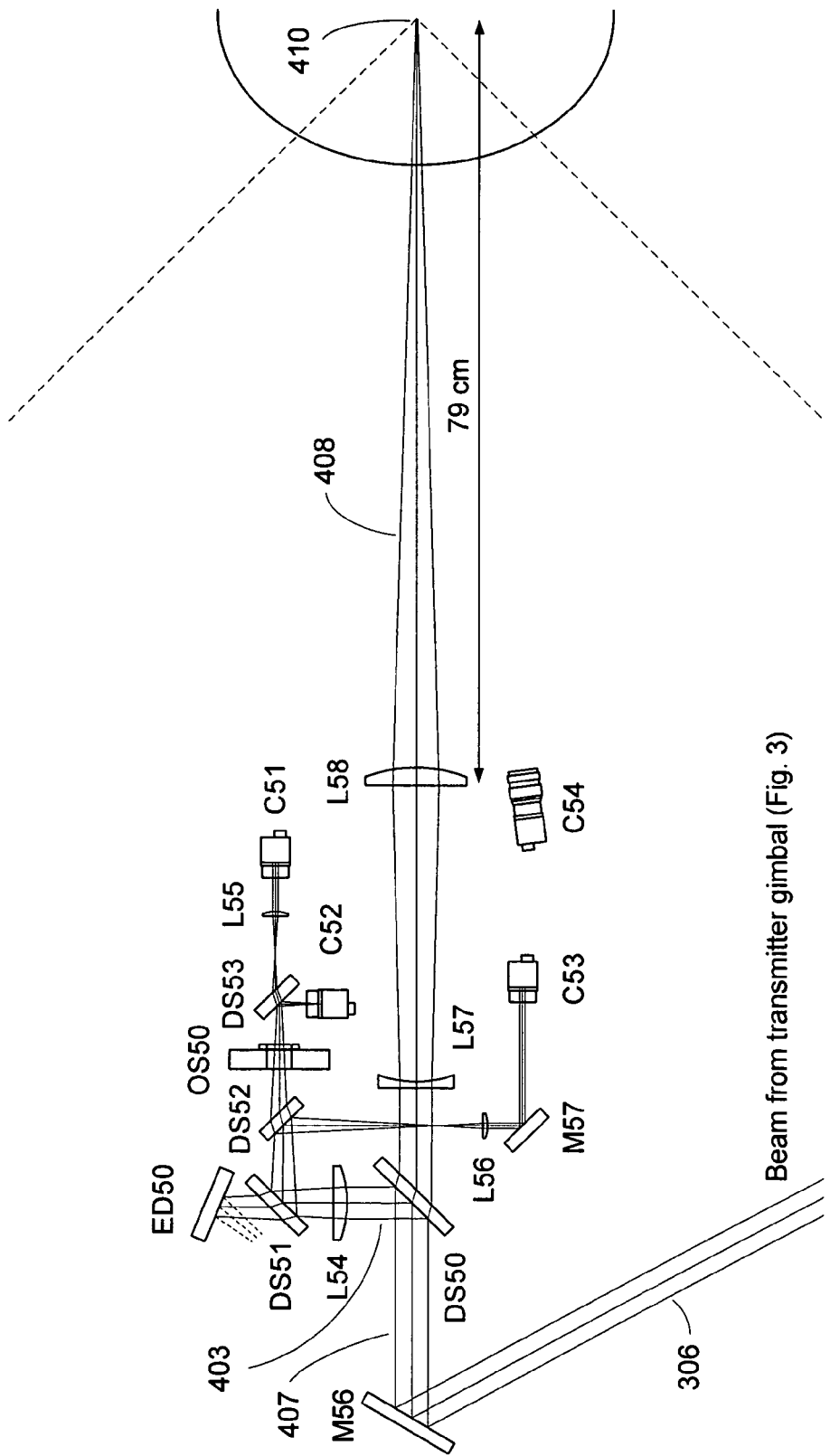
FIG. 4 is a diagram of robot mounted optical assembly, including a receiving mirror and output optics for energy delivery systems like those of FIGS. 1 and 2.

FIG. 4 illustrates the receiving mirror M56, and other optics in the robot mounted optical assembly on the processing head in an embodiment of the system including input optics of FIG. 3. The receiving mirror M56 accepts the beam on beam line 306 from the transmitting mirror M55 (FIG. 3). The receiving mirror M56 is adjusted to turn the beam on a seventh segment of the optical path on line 407 toward diagnostic beam splitter DS50. The beam propagates through the diagnostic beam splitter DS50 to an output telescope comprising lenses L57 and L58. The combination of the beam transport telescope and input optics, and the output telescope on the processing head establish a target image plane 410 for a 3 mm spot at a location 79 cm from the final lens L58 in one embodiment.

The relay imaging system illustrated in FIGS. 3 and 4 places a precise, demagnified image of the near field output beam from the laser near the surface of the part. Using a laser source like that shown in FIG. 7, which produces a highly uniform, flat-topped irradiance profile in the near field output of the laser, a highly uniform, flat-topped irradiance profile, free from significant optical diffraction structure otherwise caused by propagation away from the source, is projected into a target image plane that lies within a determinate range of the target surface of the work piece. The irradiance profile on the target surface of the work piece within a determinate range of this target image plane maintains substantially the same quality as the near field image from the output of the laser. The range allowed around the target image plane for placement of the work piece depends on the parameters of the operation being performed, and can be for example within plus or minus one meter of the target image plane in a particular embodiment. In other embodiments, lesser or greater determinate ranges for placement of the target surface on the work piece relative to the target image plane are suitable, depending on the characteristics of the laser energy, the requirements of the function being performed by the laser energy and other factors.

Beam diagnostics on the processing head provide for sensing shot-to-shot energy measurements, alignment diagnostics, and output beam profile diagnostics. Diagnostic beam splitter DS50 directs a small fraction (about 0.8% for example) of the incoming beam to the diagnostic components on line 403 through lens L54, and diagnostic beam splitter DS51. A calibrated pyroelectric energy meter ED50 placed in the beam which propagates through the diagnostic beam splitter DS51 will provide shot-to-shot energy measurements at the processing head. The diagnostic beam splitter DS51 directs a portion of this beam to alignment diagnostics including diagnostic beam splitter DS52, optical shutter OS50, diagnostic beam splitter DS53, lens L55, camera C51, camera C52, lens L56, mirror M57 and camera C53. The telescope consisting of lenses L54 and L56 forms an image of the high power square beam at the output aperture of the laser on camera C53. This also corresponds to the spatial profile, scaled in size, at the treatment plane on the surface of the part. Lenses L54 and L55 place an image of the beam at the plane of the receiver gimbal mirror M56 onto camera C51. Camera C52 is placed at the focus (far field) of lens L54 so that the position of the alignment beam on this camera indicates the pointing angle from the receiver gimbal. The optical shutter OS50 is closed during high energy peening in order to protect the alignment cameras from the high power beam since C51 and C52 are set up to be used with the low power CW alignment beam.

For the purpose of context, in a system utilized for laser peening objects mounted on a fixed stage, or on a rotating stage, as described above, the distance from the receiver gimbal and the target plane in a typical system may be from about 0.5 to about 1.5 meters. The distance however can be longer or as shorter, depending on the particular use of the beam delivery system and practical limitations on sized of components.

The rotational parts stage shown in FIG. 1 comprises, for example, a single axis rotary stage controlled by the processing robotics system. An embodiment of the active beam delivery system is configured to deliver the beam within a ±45 degree solid angle ($0.5\pi$ steradians) over a treatment volume of $50 \times 50 \times 50$ cm$^3$. This treatment volume can be further expanded by limiting the angular range (i.e. incident angles closer to normal) or by moving the entire robotic platform as discussed previously. Another method of simplifying the required robot movement is to place the work piece to be processed on a simple rotary stage that is driven by the robot controller as a "seventh axis." By transferring angular motions that would be required by the beam in the horizontal plane to rotation of the part, additional flexibility is provided. In this way, the processing head angular motion can be primarily in and out of the plane of the drawing in FIG. 4 with horizontal angles provided by part rotation. This provides access to other surfaces of a multi-sided part and will also be particularly applicable to parts with circularly symmetric cross-sections such as gears and integrated blade rotors.

Figure 5:
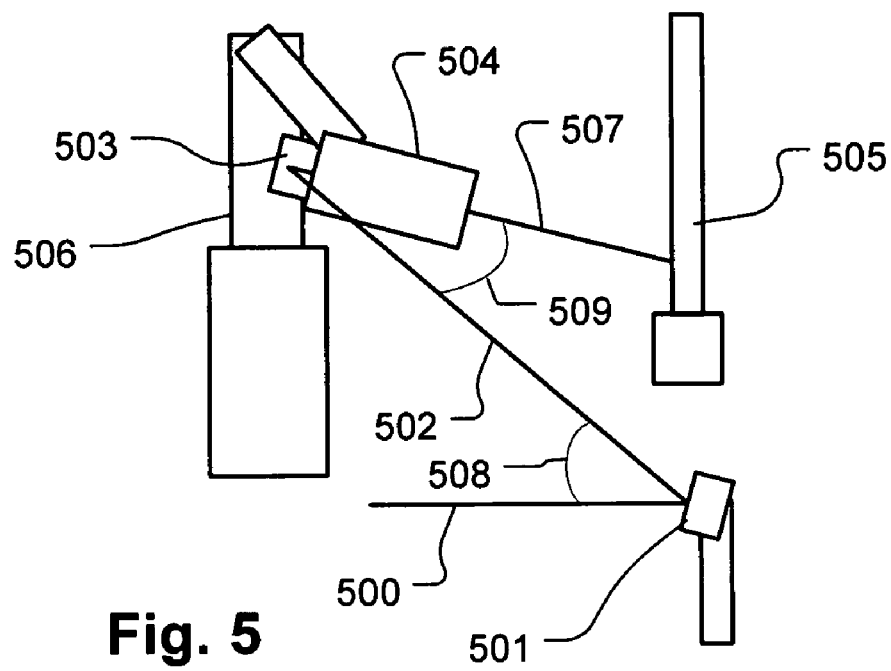
FIGS. 5 and 6 are simplified diagrams of energy delivery systems like those of FIGS. 1 and 2.
Figure 6:
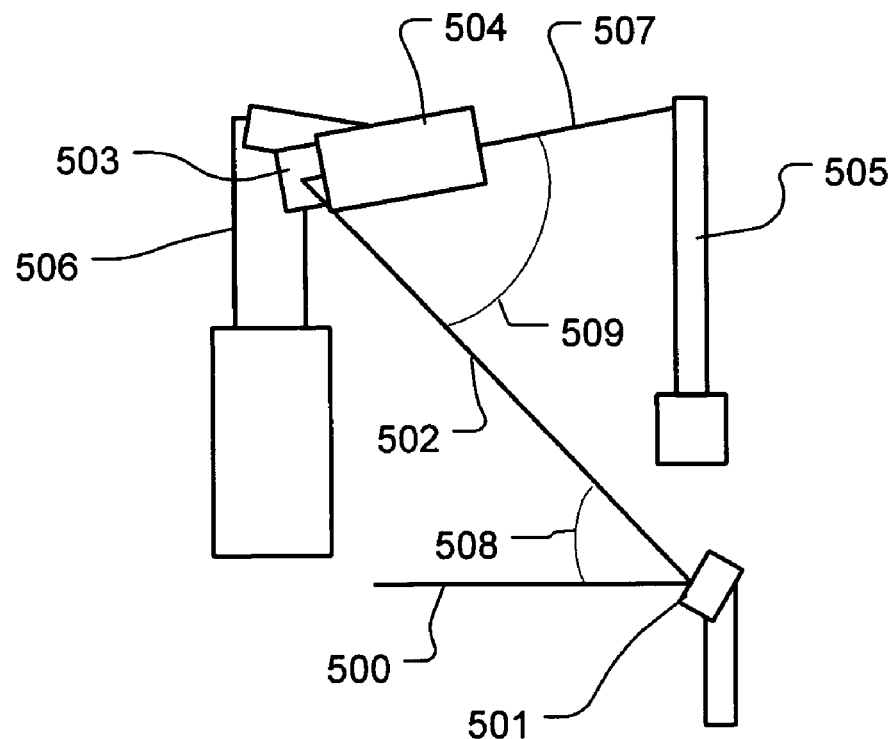

FIG. 5 and FIG. 6 provide perspective views of a laser energy delivery system implemented as described above. The input laser beam on line 500 is projected by the input optics to the mirror on transmitter gimbal 501. The mirror on transmitter gimbal 501 reflects the beam across the variable length of air at a variable angle on line 502 to the mirror mounted on the receiver gimbal 503. The beam is propagated through the processing head 504 including diagnostics and an output telescope on beam line 507 to a target work piece 505. Robot 506 positions the processing head 504 for delivery of the beam. The receiver gimbal 503 and the transmitter gimbal 501 are coordinated to deliver the laser radiation to the processing head 504. As illustrated in FIG. 6, as the robot 506 repositions the processing head 504, the transmitter gimbal 501 is operated in coordination with the receiver gimbal 503 to direct the beam to the target location. As can be seen, the beam on beam lines 500 and 502 lies in a plane (508) the orientation of which is defined by the incident and reflected angles on the mirror mounted on the transmitter gimbal 501. Also, the beam on the beam lines 502 and 507 lies in a plane (509) the orientation of which is defined by the incident and reflected angles on the mirror mounted in the receiver gimbal 503. As the robot positions the processing head 504, these planes rotate, and the direction of the beam line 502 and the distance between the transmitter gimbal 501 and receiver gimbal 503 change.

The automation of the active beam delivery system including the transmitter and receiver gimbals can be accomplished with a software controlled robot system including a program acting as a "controller in charge," executing the laser peening process by manipulating the beam delivery tool. A previously defined process map for a given part is traversed by the controller, which will fire the laser, as needed. A higher level system can be configured to transfer process control from the robot system to a central controller. This controller would direct the laser (via fire triggers), beam delivery gimbals, as well as the two process robots. Other control system configurations can be applied as suits the particular embodiment, including for example a remote computer for centralized actuation of in situ processing.

The process variables for each laser spot on a part consist of a (x, y, z) target location, an incidence angle ($\theta$, $\phi$) on the target location, the square beam rotation parameter, and the distance of the processing head from the treatment surface (determining spot size). As the robot controller (or a higher level central controller) prepares to move the processing head to the next processing spot, it broadcasts the parameters to the gimbal controller logic so that appropriate adjustments to the transmitter and receiver gimbal angles, as well as the field and polarization rotations, can be made in coordination with robot motion. Based on the calibrated position of the robot, the parameters should include the computed (x, y, z) position of the center of the receiver gimbal, the ($\theta$, $\phi$) angle to the part, and the square beam rotation. When the gimbal controller logic has finished the move and the gimbals have settled, it will notify the robot controller which can then fire the laser and move to the next processing spot.

In order to direct the high power beam from the transmitter gimbal mirror to the center of the receiving gimbal mirror and then to orient the receiving gimbal mirror to deliver the beam accurately down the optical axis of the processing head, the gimbal controls are calibrated to the coordinate system used by the robot controller. Mapping of the coordinate system can be done, for example, by causing the robot controller to step through a known set of calibration positions, based on its own coordinate system. At each position, the beam can first manually, then under feedback control, be optimally directed to match each position. From the position data broadcast by the robot controller for each point and the gimbal angles required to match these positions, a consistent coordinate system can be constructed for the gimbal controller logic.

As described above, there are four calibration cameras mounted to the processing head. Each of these has a separate alignment role. There are two representative modes of operation using the alignment cameras. In the first, the cameras will be used only to periodically confirm correct beam alignment to the processing head optical axis such as during a calibration procedure or before the processing of each part or group of spots on a part. The second mode of operation will involve closed-loop optimization of the pointing angles in between each laser shot. The process applied in a given application therefore includes a single calibration step using the low power laser, continuous calibration between each laser shot, or some intermediate regime.

In one embodiment, the outputs of each of the four diagnostic cameras are fed into a 4-channel frame-grabber. Onboard image machine-vision processing will offload computational demands from the control computer, allowing maximum throughput. Each camera is capable of triggered operation in an embodiment of the system, so that image acquisition can begin immediately, on demand, without the need to wait for the next CCD refresh cycle. A description of examples of the function of each of the four cameras is provided in the following sections.

The gimbal position camera is denoted as C51 in FIG. 4. The optics feeding C51 are set up to provide an image of the alignment beam at the optical plane of the receiver gimbal mirror. In this way, the calibrated position of the beam image on the camera provides information about the centering of the beam on the receiver mirror M56 and is not effected by the tilt angle on receiver mirror M56 (within the field of view of the camera). Given a calibrated coordinate system for the gimbals, the position of the beam on receiver mirror M56 then directly corresponds only to the delivery angle of the transmitting gimbal mirror M55 and can be used to correct the delivery angle from the transmitter gimbal mirror M55.

The gimbal angle camera is denoted as C52 in FIG. 4. C52 is placed precisely at the focal point of the lens L54. In this way, the position of the beam image on this camera relates to the beam delivery angle from the receiver gimbal mirror M56 and is not affected by the position of the beam on the receiver gimbal mirror M56. The position of the image on the camera can be used to correct the delivery angle from the receiver gimbal mirror M56.

The near-field camera is denoted as C53 in FIG. 4. The optics feeding C53 are set up to provide an image of the high power square beam at, or in the near field of, the output aperture of the laser system. This image also provides the spatial profile of the beam at the treatment surface. By placing the camera on the beam delivery processing head, any problems that could arise from optical damage in the beam delivery train or from misalignment or beam clipping can be detected. The size of the beam, its uniformity, and its rotational orientation for each laser shot can be monitored.

The process camera is depicted in FIG. 4 as C54. It is mounted on the output of the processing head and will be fitted with a standard video imaging lens which will have a fixed focus at the treatment plane. It can show a detailed view of laser peening progress. Camera C54 has many more alternative or additional applications. In one embodiment, the camera will be able to view both ambient visible lighting as well as the low-power infrared alignment beam, and can be used to actively align the robot coordinate system to the optical axis of the processing head. The process camera C54 is used in an embodiment to apply machine-vision analysis to locate and calibrate the position of the part to be treated, potentially eliminating the need for coordinate measurement with a touch probe (Renishaw style). Using calibration targets of known dimensions, analysis of recorded image dimensions will also provide the calibration of the distance between the processing head and the treatment surface.

Treatment rates can be limited due to the time required for robot moves. The automation processes moving the beam delivery processing head, rather than the part being treated, accelerate treatment. However, some of the same fundamental mechanical limitations will remain. Using the active beam delivery system, two representative strategies increase production throughput.

First, by continuously moving the output beam line (via movement of the processing head) and water robots along with the beam transmitting and receiving gimbals, the laser system, appropriately synchronized, is fired to generate the desired treatment pattern without stopping processing head movement between each shot. The need for mechanical settling of the robots and gimbals between each pulse is eliminated or reduced, increasing throughput.

In alternative approaches, multiple laser peening spots on a target are accessed from a processing head position by scanning only the receiver mirror gimbal at the input to the processing head. The number of spots accessible will be limited only by the field of view of the delivery optics. For example, a 5×5 array of 3 mm square spots could be laid down from a single processing head position with appropriate selection of optical components. The ultimate repetition frequency of the treatment would be limited only by the settling time of the water layer between pulses. This could be a very powerful technique, recognizing that the pulse repetition frequency PRF of lasers such as shown in FIG. 7, can reach even 10 Hz for 10-20 shots at a time as long as the average PRF, averaged over a period of ~30 s remains at 5 Hz or less. Rapid laser bursts followed by repositioning of the processing head between bursts could cover large process areas and would be very useful in laser peen forming processes.

The basic architecture of a master oscillator/power amplifier configuration with a regenerative laser amplifier including an SBS phase conjugator mirror system and relay telescope with a baffle is shown in FIG. 7, that is suitable for use in systems as described herein. The embodiment of FIG. 7 is an improved version of a similar amplifier described in U.S. Pat. No. 5,239,408, which is incorporated by reference as if fully set forth herein. The amplifier system of FIG. 7 includes a rotator 740, such as a Pockels cell or Faraday rotator, a first intra-cavity relay telescope 720, a slab-shaped gain medium 750, a second intra-cavity relay telescope 770 and an SBS phase conjugator/mirror system 760. The slab 750 is enclosed in a pump cavity (not shown). Two polarizers 702 and 706 are also included for capturing an input pulse, and extracting an output pulse, respectively. Seven flat, highly reflecting mirrors 711, 712, 713, 714, 715, 716, and 717, define an optical path through the slab 750, and telescope 720, polarizer 706 and telescope 770 connect the ring to SBS phase conjugator 760. An additional relay telescope 780 relays images of the near field output (a location near the output at polarizer 706) of the ring amplifier to target delivery optics not shown.

In operation, a master oscillator 708 supplies an input pulse which has S-polarization. The pulse reflects off polarizer 702, proceeds through an isolation rotator 740, remaining unchanged in polarization, and is further reflected off polarizer 706 into a ring shaped optical path defined by mirrors 711-717, proceeding for this ring transit in a counter-clockwise direction off of the polarizer 706.

In the ring, the beam enters the 90 degree rotator 708 which rotates the beam by 90 degrees to the P-polarization. The pulse proceeds through mirrors 711 and 712 along optical path 719 through relay telescope 720.

The telescope 720 includes a vacuum chamber 722 having a first lens 724 mounted by a vacuum tight seal 726, and a second lens 728 mounted by vacuum tight seal 730. A baffle 729 at the telescope focal point inside the vacuum chamber 722 blocks off angle beams and ghost reflections.

From telescope 720, the beam proceeds through mirror 713 into and through the slab 750 where it is reflected by mirrors 714 and 715 back through the slab 750. Near unity fill of the pumped volume is accomplished by a first zig-zag pass and a second zig-zag pass which are essentially mirror images about the direction of propagation. In this way, the second zig-zag pass will tend to extract gain from regions that may have been missed in the first pass.

From slab 750, the beam is reflected off mirror 716 along path 742 through telescope 720, off mirror 717 where it is reflected back into polarizer 706. Since the beam has been rotated by the 90 degree rotator 708 from the S-polarization to the P-polarization, the P-polarized beam is transmitted by polarizer 706 to 90 degree rotator 708 to proceed through the ring counter-clockwise a second time. However, during this second pass through the ring, 90 degree rotator 708 rotates the polarization by 90 degrees back to the S-polarization. Therefore, when the beam reaches the polarizer 706 at the end of a second pass through the ring, it will be reflected into SBS phase conjugator 760, through the second intra-cavity relay telescope 770.

The beam proceeding back out of the SBS phase conjugator, still having the S-polarization, but reversed phase error, will be reflected by polarizer 706 in a clockwise direction to mirror 717 where it will proceed along path 742 through telescope 720 to mirror 716. From mirror 716, the beam will proceed through slab 750 a first time and be reflected back through the slab 750 a second time by mirrors 714 and 715. Proceeding out of slab 750, the beam will be reflected off mirror 713 and proceed back through telescope 720 and mirrors 712 and 711 to 90 degree rotator 708. The 90 degree rotator 708 will rotate the polarization by 90 degrees back to the P-polarization and transmit the beam to polarizer 706, thus completing a third pass through the ring, but this time in the reverse direction from the first two passes.

Since the beam has a P-polarization, the beam will pass through polarizer 706 and proceed clockwise through the ring for a fourth pass through the ring, or a second pass in the reverse direction. At the end of this fourth pass through the ring, the 90 degree rotator will rotate the polarization back to the S-polarization causing the beam to reflect off of polarizer 706 out of the ring and into isolation rotator 740. By this point, the net accumulated phase error is essentially zero, providing a wavefront corrected output pulse. The isolation rotator 740 will rotate the polarization of the beam to the P-polarization enabling the beam to pass through polarizer 702 as a high energy output pulse.

Thus, the beams passing through the amplifier illustrated in FIG. 7 exhibit reduced diffraction, minimizing the likelihood of high peak perturbations in a beam, by utilizing two paths around the ring before entering the phase conjugator, and two equal and opposite paths around a ring after exiting the phase conjugator. The ring, further, utilizes a passive polarization rotator instead of a Pockels cell. Additionally, all optical components within the resonator are placed near the image planes by the use of relay telescopes (two paths through first intra-cavity telescope 720 and of the second intra-cavity telescope 770). The amplifier also exhibits higher gain-to-loss ratio, with two slab passes providing gain in each ring transit. The SBS phase conjugator acts as a mirror system and offsets phase aberrations in the beam. In embodiments of the invention, the SBS phase conjugator/mirror system 760 includes components used for pulse width control, used as an alignment fiducial for the optical path in the ring, and which limit self-focusing and other aberrations induced by SBS media.

The single-frequency master oscillator 708 in FIG. 7 in one preferred embodiment, comprises a relaxation pulse-seeded oscillator, which provides consistent single-frequency with good amplitude and temporal stability, with representative pulse profiles having a pulse height of greater than 1.2 megawatts and a pulse width of about 24 nanoseconds full width half maximum. Other master oscillator embodiments can be used as mentioned above. The relaxation pulse-seeded oscillator in one embodiment includes a laser resonator having an output coupler and a number of other reflectors defining an optical ring, preferably having an odd total number of reflectors including the output coupler. A Q-switch and a gain medium are included in the resonator. A detector is coupled with the resonator to detect oscillation energy in the resonator. A controller is coupled to a source of energy for the gain medium, to the Q-switch, and to the detector. A component in the resonator induces loss while building up gain in the gain medium with the source of pump energy, until a gain-to-loss ratio is achieved that is sufficient to produce a relaxation oscillation pulse. Upon detection of an onset of the relaxation pulse, the controller decreases the loss using the Q-switching so that an output pulse having a single frequency is generated. A set of etalons in the resonator restricts oscillation to a single longitudinal cavity mode during the onset of the relaxation oscillation pulse. Also, a transverse mode limiting aperture is placed in the laser resonator.

A laser peening method and system, and laser energy delivery system suitable for such use and other uses, which allows the work piece to be fixed, while moving and directing the laser beam in a highly controlled manner is provided. Utilizing a fixed work piece position minimizes holding fixture and work piece moving complexity, thereby reducing cost and engineering. Moving the laser beam rather than the work piece will allow work pieces and structures larger than automation handling capacity to be cost effectively laser peened.

A system as described herein provides sufficient flexibility to be able to treat large work pieces "in situ" at customer facilities, for example aircraft at an aviation repair station or large oil drilling work pieces at a pipe yard. A particular application of interest is that of laser peen forming, requiring parts that can be many tens of meters in length to be treated.

In general, a methodology and associated mechanisms to allow controlled movement of high energy laser beam pulses across the surface of various work pieces, the work piece held in the fixed position during processing is provided which maintains the laser beam's near field spatial profile and image and shot position orientation with reference to other laser shots. The system is capable of creating a field of compressive residual stress on a work piece surface and subsurface by laser peening using a well-defined pattern of laser shots, often arranged into rows of adjacent shots. Each shot must be placed at the proper work piece location by careful control of laser beam incidence angle. Beam image location and beam rotation indicates the square or rectangular beam. Movement of the work piece subject of laser peening or other processing is reduced or eliminated in systems applying the present technology.

Representative uses of the described technology include laser peening small and large work pieces and structures, laser peening forming, laser beam delivery for other surface modifications such as heat treatment, texturing, cutting and welding. The system is adaptable for beam delivery for materials processing application of laser energy, including but not limited to including superplastic forming, paint or other type of coating removal, etching, engraving and marking.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A method for laser peening a surface of a work piece, comprising:

generating first and second laser pulses with a laser system having a fixed position relative to a first optic in a set of optics, and wherein the first optic is controllable to direct laser pulses in an adjustable direction without intervening optics to a second optic in the set of optics, the second optic having a position movable in three dimensions relative to the first optic defining a segment in beam paths through the set of optics having an adjustable length and an adjustable direction, and controllable to direct laser pulses received via the first optic to another optic in the set of optics;

positioning the set of optics to configure a first beam path for propagating laser pulse energy to a first target location on the surface of a work piece;

applying the first laser pulse to the first beam path to peen the first target location on the surface of the work piece;

after applying the first laser pulse, positioning the set of optics to configure a second beam path for propagating laser pulse energy to a second target location on the surface of a work piece, the second beam path being different than the first beam path, wherein the segment from the first optic to the second optic has a different length and a different direction in the second beam path than in the first beam path; and applying the second laser pulse to the second beam path to peen the second target location on the surface of the work piece; wherein the first and second beam paths include respective segments from the first optic to the second optic having adjustable length of about one meter or more through air.

2. The method of claim 1, wherein the second optic is mounted on a robot with an optical assembly for delivery of the first and second pulses to the respective first and second target locations.

3. The method of claim 1, including delivering a flow of tamping layer fluid to the first and second target locations.

4. The method of claim 2, including delivering the flow of tamping layer fluid to the first and second target locations using a delivery tool mounted on the robot with the optical assembly.

5. The method of claim 1, including applying said first and second laser pulses to a work piece in situ.

6. The method of claim 1, wherein the first and second pulses have cross-sections, and including enlarging the cross-sections of the first and second pulses for propagation through the respective segments.

7. The method of claim 1, wherein the first and second pulses have cross-sections, and including rotating the cross-sections of the first and second pulses.

8. The method of claim 1, wherein the first and second beam paths include respective segments from the first optic, having incident and reflected beam paths, to the second optic, having incident and reflected beam lines, and including rotating cross-sections of the first and second pulses according to an angle between a plane containing the incident and reflected beam lines on the first optic and a plane containing the incident and reflected beam lines on the second optic.

9. The method of claim 2, including mounting the robot on a movable platform.

10. The method of claim 2, including mounting the robot on a movable platform on a rail system and positioning the rail system adjacent to a structure including the work piece in situ.

11. The method of claim 1, including placing the work piece on a rotary stage, and rotating the work piece in combination with positioning the set of optics to configure the first beam path.

12. The method of claim 1, wherein the work piece has a substantially circularly symmetrical cross-section, and including placing the work piece on a rotary stage, and said rotating the work piece in combination with positioning the set of optics to configure the first beam path.

13. The method of claim 1, wherein the first and second laser pulses have respective energies per pulse in a range from about 10 to about 100 Joules per pulse.

14. The method of claim 1, wherein the first and second laser pulses have respective pulse widths in a range from about 10 to 30 nanoseconds.

15. The method of claim 1, wherein the first and second laser pulses have respective energies in a range from about 10 to about 100 Joules per pulse and respective pulse widths in a range from about 10 to 30 nanoseconds.

16. The method of claim 1, including relaying an image of a near field output of the source to a target image plane, and wherein said first and second beam paths position the target image plane within a range of distance before or after the first and second target locations.

17. The apparatus of claim 1, including relaying an image of a near field output of the source to a target image plane, and wherein said first and second beam paths position the target image plane within about 1 meter before or after the first and second target locations.

18. The method of claim 1, including directing a fraction of the first pulse from the first beam path to diagnostic components.

19. The method of claim 1, wherein the first and second pulses have a wavelength of about 1.1 micron or less, and an energy greater than 250 mJ per pulse.

20. The method of claim 1, wherein the first and second pulses have a wavelength of about 1.1 micron or less, and an energy greater than 10 J per pulse.

21. An apparatus for laser peening a surface of a work piece, comprising:

a source of pulses of laser energy having sufficient energy for laser peening the surface of the work piece;

a first adjustable optic mounted in a fixed position relative to the source of pulses adapted to direct the pulses of laser energy on a beam line having an adjustable direction;

an optical assembly having a position moveable in three dimensions mounted on a robot, the optical assembly including a second adjustable optic adapted to receive the pulses of laser energy on the beam line without intervening optics so that the beam line has an adjustable length and to direct the pulses of laser energy to another optic in the optical assembly; and a control system coupled to the robot, the first adjustable optic and the second adjustable optic, which controls the first adjustable optic to set the adjustable direction, controls the second adjustable optic to receive the pulses from the first adjustable optic and positions the optical assembly to configure a first beam path for delivery of a first pulse of laser energy via the optical assembly to the surface of the work piece and a second beam path for delivery of a second pulse of laser energy via the optical assembly to the surface of the work piece, the second beam path being different from the first beam path; wherein the adjustable length of the beam line is about one meter or more through air.

22. The apparatus of claim 21, including a second optical assembly mounted on a second robot, including a third adjustable optic; and wherein the control system is coupled to the second robot and third adjustable optic, and positions the first adjustable optic, the third adjustable optic and the second optical assembly to configure a third beam path for delivery of a third pulse of laser energy via the second optical assembly to the surface of the work piece.

23. The apparatus of claim 21, including optics which enlarge the cross-sections of the first and second pulses for propagation through the beam line.

24. The apparatus of claim 21, wherein the first and second pulses have cross-sections, and including optics which rotate the cross-sections of the first and second pulses for propagation through the beam line.

25. The apparatus of claim 21, wherein the first and second beam paths have incident and reflected beam lines at the first optic, and incident and reflected beam lines at the second optic, and including controllable optics to rotate cross-sections of the first and second pulses according to an angle between a plane containing the incident and reflected beam lines on the first optic and a plane containing the incident and reflected beam lines on the second optic.

26. The apparatus of claim 21, including a movable platform, and wherein the robot holding the optical assembly and the second optic are mounted on the movable platform.

27. The apparatus of claim 21, including a rail system adapted for placement adjacent to a structure including the work piece in situ, and a movable platform on the rail system, and wherein the robot holding the optical assembly and the second optic are mounted on the movable platform.

28. The apparatus of claim 21, including a rotary stage, adapted for holding the work piece adjacent the optical assembly.

29. The apparatus of claim 21, wherein the work piece has a substantially circularly symmetric cross-section, and including a rotary stage, adapted for holding the work piece adjacent the optical assembly, and the controller includes components that control rotation of the rotary stage.

30. The apparatus of claim 21, including a fluid delivery vessel by which a flow of tamping fluid is delivered to the surface of the work piece.

31. The apparatus of claim 21, including a fluid delivery vessel on the robot by which a flow of tamping fluid is delivered to the surface of the work piece.

32. The apparatus of claim 21, including a movable platform, and wherein the robot holding the optical assembly and the second optic are mounted on the movable platform, and including a mechanism on the movable platform to deliver a flow of tamping fluid to the surface of the work piece.

33. The apparatus of claim 21, wherein the first and second laser pulses have respective energies per pulse in a range from about 10 to about 100 Joules per pulse.

34. The apparatus of claim 21, wherein the first and second laser pulses have respective pulse widths in a range from about 10 to 30 nanoseconds.

35. The apparatus of claim 21, wherein the first and second laser pulses have respective energies in a range from about 10 to about 100 Joules per pulse and respective pulse widths in a range from about 10 to 30 nanoseconds.

36. The apparatus of claim 21, including optics relaying an image of a near field output of the source to a target image plane, and wherein said first and second beam paths position the target image plane within a range of distance before or after the first and second target locations.

37. The apparatus of claim 21, including optics relaying an image of a near field output of the source to a target image plane, and wherein said first and second beam paths position the target image plane within about 1 meter before or after the first and second target locations.

38. The apparatus of claim 21, wherein the optical assembly includes diagnostic components.

39. The apparatus of claim 21, wherein the first and second pulses have a wavelength of about 1.1 micron or less, and an energy greater than 250 mJ per pulse.

40. The apparatus of claim 21, wherein the first and second pulses have a wavelength of about 1.1 micron or less, and an energy greater than 10 J per pulse.

41. The apparatus of claim 21, wherein the source of pulses of laser energy comprises a master oscillator/power amplifier system.

* * * * *

UNITED STATES PATENT AND TRADEMARK OFFICE
CERTIFICATE OF CORRECTION

| | | |
|---|---|---|
| PATENT NO. | : 7,750,266 B2 | Page 1 of 1 |
| APPLICATION NO. | : 10/990991 | |
| DATED | : July 6, 2010 | |
| INVENTOR(S) | : Brent et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 831 days.

Signed and Sealed this
Twenty-first Day of February, 2012

David J. Kappos
*Director of the United States Patent and Trademark Office*